(12) United States Patent
Marrs et al.

(10) Patent No.: US 6,501,899 B1
(45) Date of Patent: Dec. 31, 2002

(54) VERTICAL CABLE MANAGEMENT SYSTEM

(75) Inventors: Samuel M. Marrs, Bradley; Michael T. Vavrik, Oak Forest; Jeffery Paliga, Frankfort, all of IL (US)

(73) Assignee: Panduit Corp., Tinley Park, IL (US)

( * ) Notice: Subject to any disclaimer, the term of this patent is extended or adjusted under 35 U.S.C. 154(b) by 76 days.

(21) Appl. No.: 09/585,966

(22) Filed: Jun. 2, 2000

(51) Int. Cl.[7] .................................................. G02B 6/00
(52) U.S. Cl. ........................................ 385/135; 385/134
(58) Field of Search ............................. 385/25, 53, 59, 385/89, 134–140, 147

(56) References Cited

U.S. PATENT DOCUMENTS

| | | | |
|---|---|---|---|
| 4,158,754 A | 6/1979 | Yonezaki et al. ............. 179/98 |
| 4,665,546 A | 5/1987 | Brey et al. | |
| 4,776,662 A | 10/1988 | Valleix | |
| 4,898,448 A | 2/1990 | Cooper | |
| 5,138,688 A | 8/1992 | Debortoli ..................... 385/135 |
| 5,339,379 A | 8/1994 | Kutsch et al. ............... 385/135 |
| 5,363,465 A | 11/1994 | Korkowski et al. ......... 385/135 |
| 5,448,015 A | 9/1995 | Jamet et al. ................ 174/68.3 |
| 5,458,019 A | * 10/1995 | Trevino ................... 385/135 X |
| 5,497,444 A | 3/1996 | Wheeler ...................... 385/135 |
| 5,530,954 A | 6/1996 | Larson et al. ................ 385/135 |
| 5,546,495 A | 8/1996 | Bruckner et al. ........... 385/135 |
| 5,613,030 A | 3/1997 | Hoffer et al. ............... 385/135 |
| 5,640,482 A | 6/1997 | Barry et al. ................. 385/135 |
| 5,689,604 A | 11/1997 | Janus et al. ................. 385/134 |
| 5,715,348 A | 2/1998 | Falkenberg et al. ......... 385/135 |
| 5,717,810 A | * 2/1998 | Wheeler ...................... 385/135 |
| 5,758,002 A | * 5/1998 | Walters ....................... 385/134 |
| 5,758,003 A | 5/1998 | Wheeler et al. ............. 385/134 |
| 5,788,087 A | 8/1998 | Orlando ........................ 211/26 |
| 5,836,551 A | 11/1998 | Orlando ........................ 248/49 |
| 5,898,129 A | 4/1999 | Ott et al. ...................... 174/59 |
| 6,009,223 A | * 12/1999 | Arizpe ........................ 385/134 |
| 6,009,224 A | * 12/1999 | Allen .......................... 385/135 |
| 6,307,999 B1 | * 10/2001 | Daoud ........................ 385/135 |

* cited by examiner

Primary Examiner—Brian Sircus
Assistant Examiner—Son V. Nguyen
(74) Attorney, Agent, or Firm—Robert A. McCann; Jay A. Saltzman; Christopher S. Clancy

(57) ABSTRACT

The invention is a vertical cable management system having a plurality of fanning guides and a plurality of cable management rings mounted to a frame. Additionally, the invention may include enclosures, fanning guide arrays, and cable management rings having a plurality of defined channels.

10 Claims, 4 Drawing Sheets

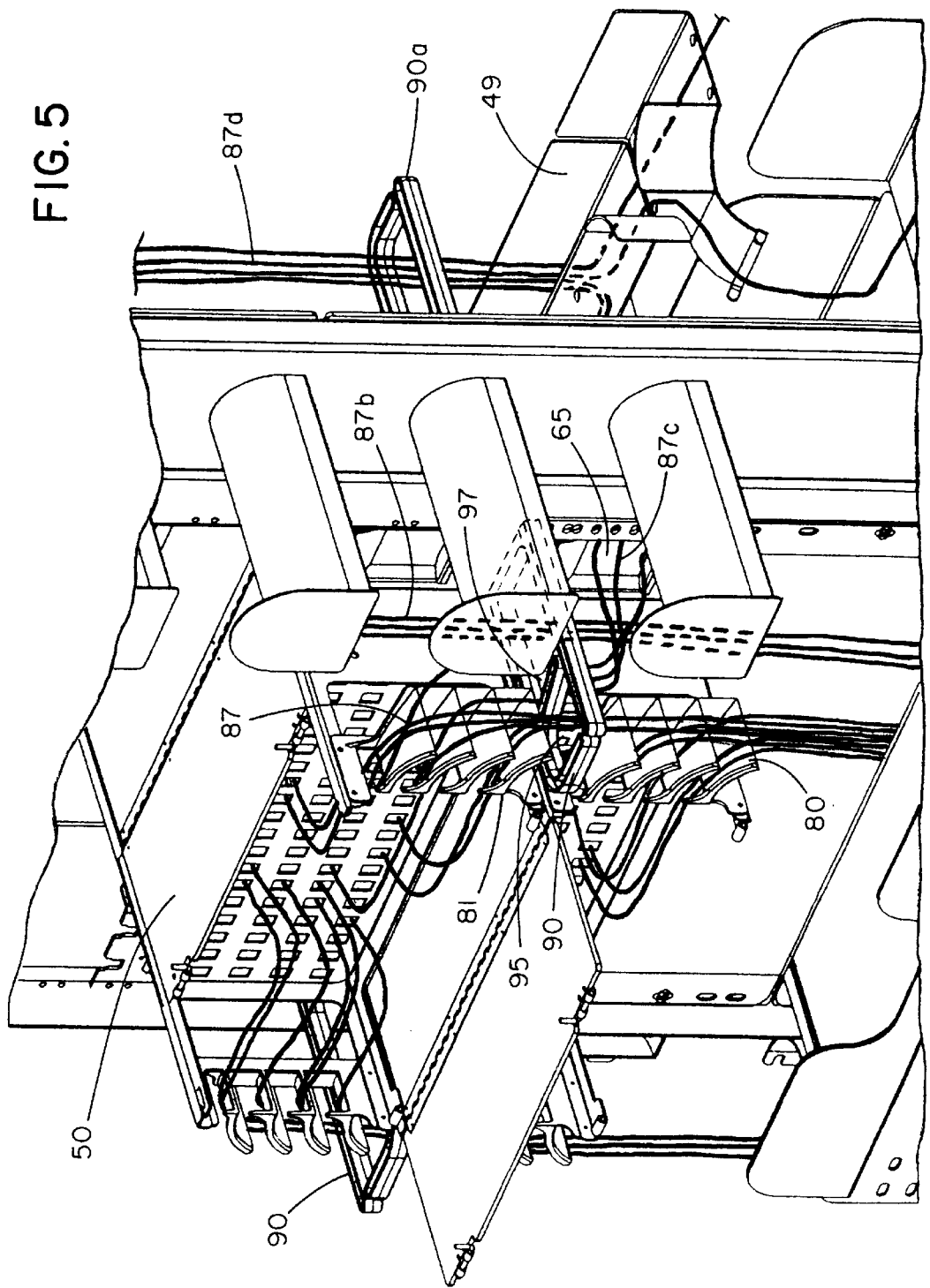

VERTICAL CABLE MANAGEMENT SYSTEM

RELATED APPLICATIONS

This disclosure is related to the following U.S. patent applications filed on the same date as this application, each of which is owned by the assignee of this application, and the entirety of each of which is hereby incorporated herein by reference:

U.S. patent pplication entitled "Improved Cable Management System," naming Jack E. Caveney and Dale A. Block as an inventor.

U.S. patent application entitled "Modular Latch and Guide Rail Arrangement for Use in Fiber Optic Cable Management Systems," naming Samuel M. Marrs, Robert R. Brown and John J. Bulanda as inventors.

U.S. patent application entitled "Slack Cable Management System," naming Jack E. Caveney as an inventor.

U.S. patent application entitled "Improved Enclosure for Use in Fiber Optic Management Systems," naming Michael T. Vavrik and Philip B. Chandler, Jr. as inventors.

U.S. patent application entitled "Universal Mounting System for a Fiber Optic Management Center," naming Michael T. Vavrik and Philip B. Chandler, Jr. as inventors.

1. Field of the Invention

The present invention relates to improved methods and apparatus for managing fiber optic connections and fiber optic cables as part of a fiber optic communication system. More particularly, the present invention relates to a vertical cable management system that can be used as part of a diverse fiber optic cable management system at an operations center, where numerous in-coming and out-going fiber optic cables meet at a central access point.

2. Background of the Invention

Within recent years, there has been a rapidly increasing development and use of telecommunications in business and personal activities. Simultaneously, there has been an accelerating trend toward "convergence" in the telecommunications industry. That is, many historically distinct forms of telecommunications, e.g., telephone, data transmission, e-mail, radio, television, videoconference, internet access, and on-line applications, are being combined into a single channel of communication. This combination of factors is causing a paradigm shift in the amount of bandwidth necessary for telecommunications service to modem office buildings. The increased bandwidth requirements cannot be effectively satisfied by traditional copper cables, but, instead, requires switching to fiber optic cable.

Although much attention has been paid to the electrical and electronic techniques for using the bandwidth in fiber optic cable and for interconnecting the signals of copper cable and fiber optic cable, relatively less attention has been given to the unique physical needs of handling, connecting, and maintaining fiber optic cable. However, the mechanical devices that have been developed for handling copper cable do not work well for fiber optic cable because of the relatively delicate, yet technically precise nature of fiber optic cable.

For examples, unlike copper cable, fiber optic cable cannot be readily cut and spliced on demand to make a desirable connection fit in the field. Rather, fiber optic cable is purchased in predetermined lengths, with connectors that have been installed in the factory. Field workers must utilize these predetermined lengths of cable, regardless whether the length is appropriate for the task at hand. At the same time, the relatively fragile and delicate nature of fiber optic cable prohibits bundling excess cable as might be done with copper cable. If fiber optic cable is excessively bent or stressed, the signal within may become seriously disrupted.

Moreover, it must be recognized that an operations center, such as occurs in the field of this invention, typically houses hundreds (and sometimes thousands) of fiber optic cables. It is particularly important that operations center provide for installing the fiber optic cables in a manner that secures and protects any excess fiber optic cable without compromising its relatively delicate nature. Yet, in the event that equipment is changed or moved, each individual fiber optic cable must also be maintained in such a manner that it can be identified, isolated, and retrieved without unduly disturbing other fiber optic cables.

It should also be recognized that a fiber optic cable may be connected to a variety of different type devices which are also housed in the operations center, i.e., patch panels of different sizes, splicer drawers, connector modules, etc. There is a need within the industry for a fiber optic cable management systems that may facilitate the substitution and replacement of one such device by another, without needing to remove or reinstall all of the fiber optic cable associated with the original device. For example, such devices have historically been assembled in racks that are bolted to the floor of the communications center. Furthermore, when it is necessary to upgrade or repair equipment, maintaining system operation during these procedures is an important consideration. Consequently, there is need in the prior art for a cable management system organized in a manner that allows for system operation during upgrading or maintenance.

The foregoing problems are made even more difficult because the operations center actually typically comprises a three-dimensional array of devices and fiber optic cables. That is, the operations center typically houses many columns and rows of such racks, with each rack containing a vertical array of devices attached to hundreds and possibly thousands of such fiber optic cables. Each such cable must be identifiable, retrievable, and replaceable, without disrupting the surrounding cables.

Finally, it must be recognized that the all of the foregoing problems exist in a commercial environment without a single established standard for size. Historically, products within the "public network" were designed by AT&T and Western Electric, and utilized racks that were 23 inches wide, holding devices and enclosures that were 19 inches wide. The "public network" was then connected at some point to the premises in a particular building. Products intended for a "premises network" were historically based upon racks that were 19 inches wide, holding devices and enclosures that were 17 inches wide. The Telecommunications Act of 1996 has opened and triggered widespread competition within the telecommunications market. However, it has done so without establishing standards vis a vis the mechanical aspects of an operations center. Different companies are adopting different physical standards, and the line of demarcation between "public network" and "premises network" products is becoming fragmented and blurred. As a result, there is a particular need for products that can solve the foregoing problems in the context of both public network and premises network environments.

SUMMARY OF THE INVENTION

The present invention overcomes the deficiencies of the prior art by providing an improved vertical cable management system. In accordance with the present invention, the vertical cable management system comprises a plurality of fanning guides and a plurality of cable management rings secured to a frame for receiving and directing cable. In one embodiment of the invention, several fanning guides form a single fanning guide array and a plurality of fanning guide arrays are secured to an enclosure on the frame. One embodiment of the present invention also provides for cable management rings that may be partitioned by an intermediate projection into first and second channels for control and routing of cables.

These and other features and advantages of the present invention will be apparent to those skilled in the art upon review of the following detailed description of the drawings and preferred embodiments.

BRIEF DESCRIPTION OF THE DRAWINGS

FIG. 5 is a perspective view of an embodiment of a vertical cable management system of the present invention illustrating the cable pathways of the invention.

DETAILED DESCRIPTION OF THE DRAWINGS AND PREFERRED EMBODIMENTS

Figure 1:
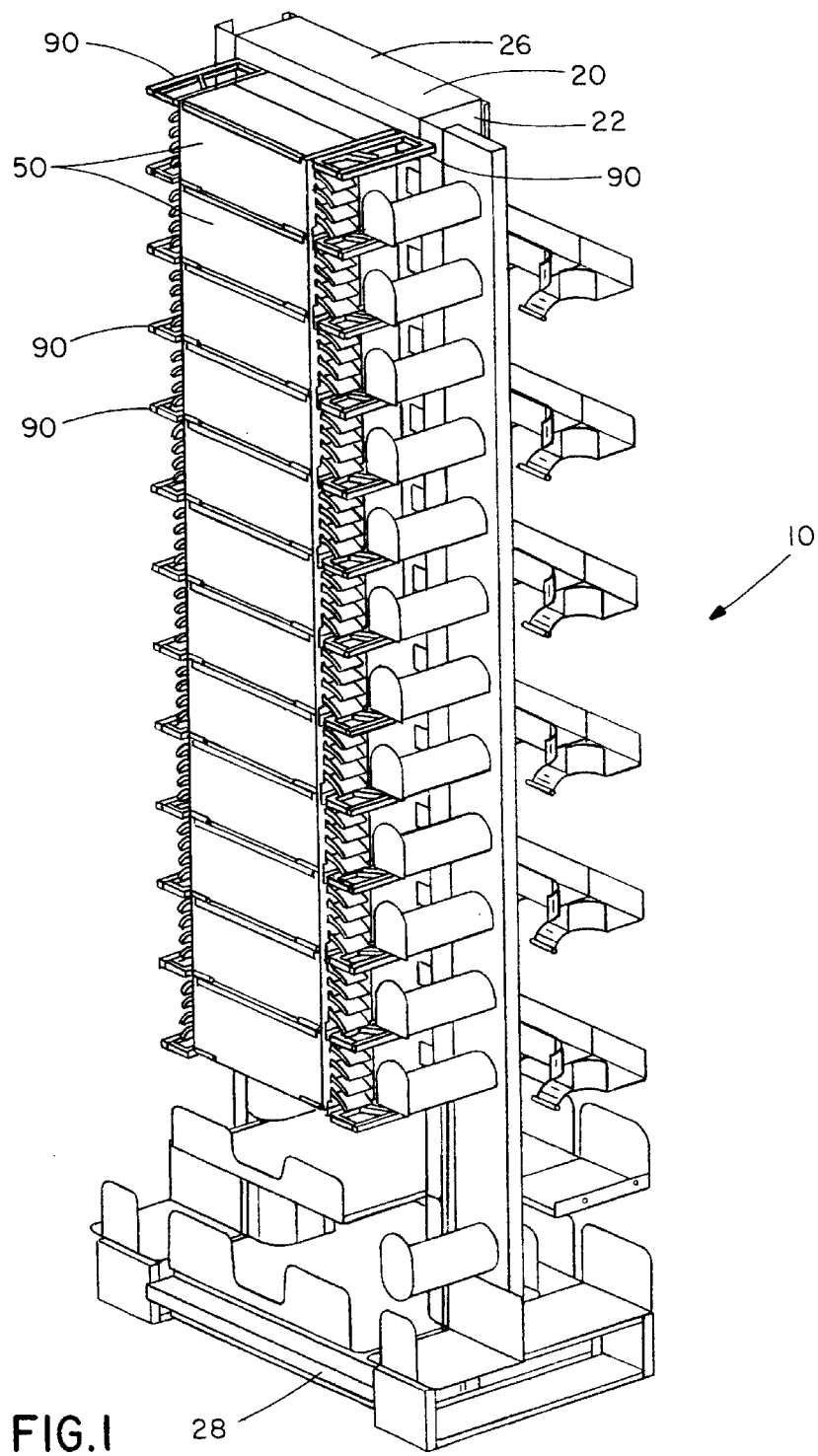
FIG. 1 is a perspective view of a cable management system.

Turning now to the drawings, FIG. 1 depicts the environment in which the preferred embodiment of the present invention will operate. The cable management system 10 shown in FIG. 1 includes an open frame 20 having spaced apart vertical side walls 22 connected at their tops by a top wall 26 and connected at their bottom by a base 28 that may be affixed to a floor surface (not shown). Generally, the frame 20 is a conventional telecommunications network rack. A plurality of enclosures 50 are attached to the sidewalls 22 by module mounting brackets (not shown). The function of the enclosures 50 is to contain fiber optic equipment, such as, for example, connector modules that are used to connect cables running from one enclosure 50 to another, either on the same or different frames 20.

Figure 2:
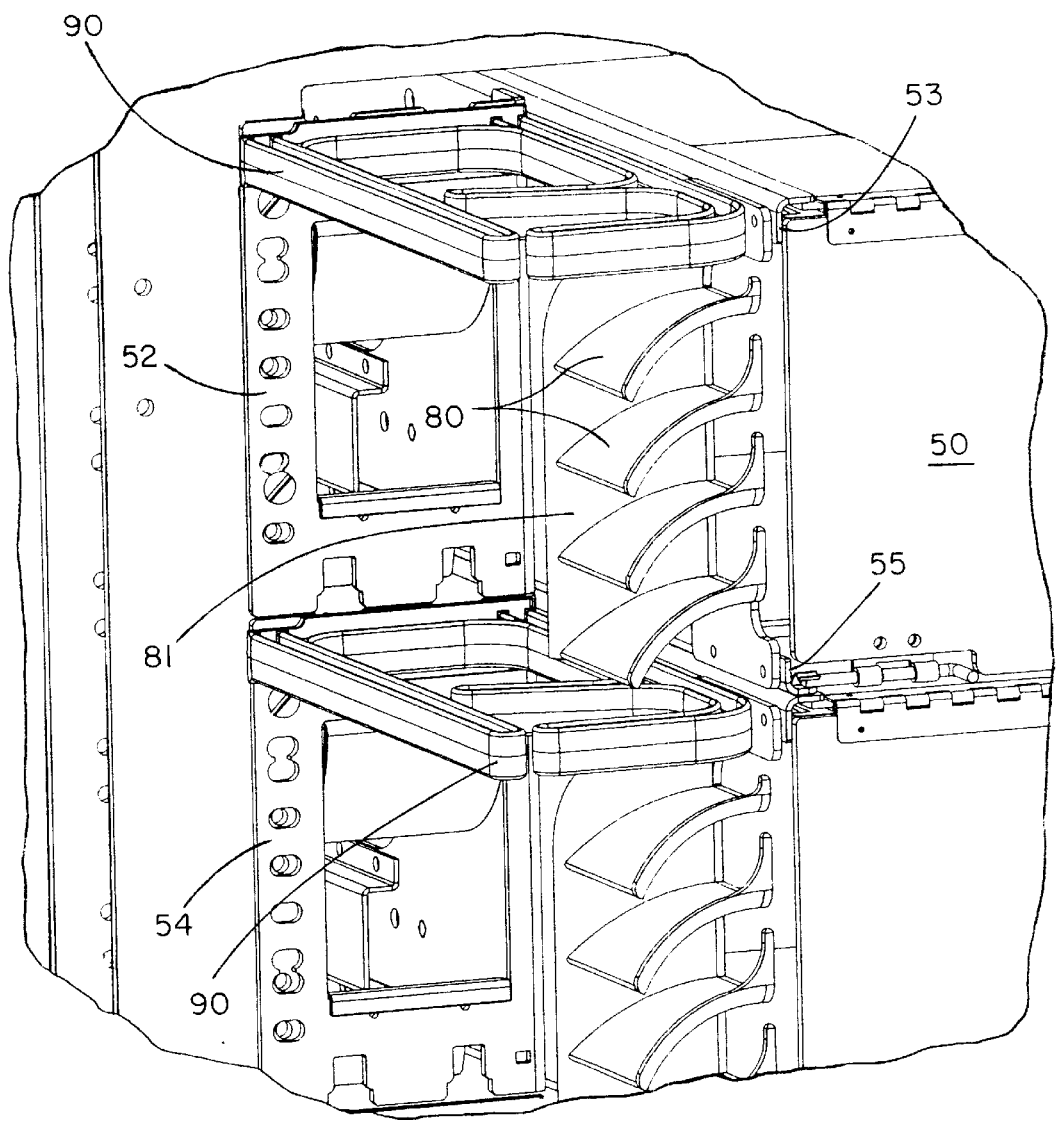
FIG. 2 is a perspective view of one embodiment of a vertical cable management system of the present invention.

FIG. 2 is a perspective view of the preferred embodiment of present invention, a vertical cable management system, in particular showing the various individual components of the system including a fanning guide array 81 and a cable management ring 90. As shown in FIG. 2, a series of fanning guides 80 forming a fanning guide array 81 is preferably secured to the side walls 53, 55 of each enclosure 50 that is installed on the frame 20. Meanwhile, a cable management ring 90 is preferably positioned between each fanning guide array 81. In order to most effectively manage large amounts of cable, it is preferred to have a plurality of cable management rings 90 positioned between each fanning guide array 81 and each enclosure 50, as shown in both FIG. 1 and FIG. 2, thus defining a vertical cable pathway. FIGS. 1 and 2 also show that the preferred embodiment of the present invention provides fanning guide arrays 81 and cable management rings 90 on both sides of each enclosure 50.

Figure 3:
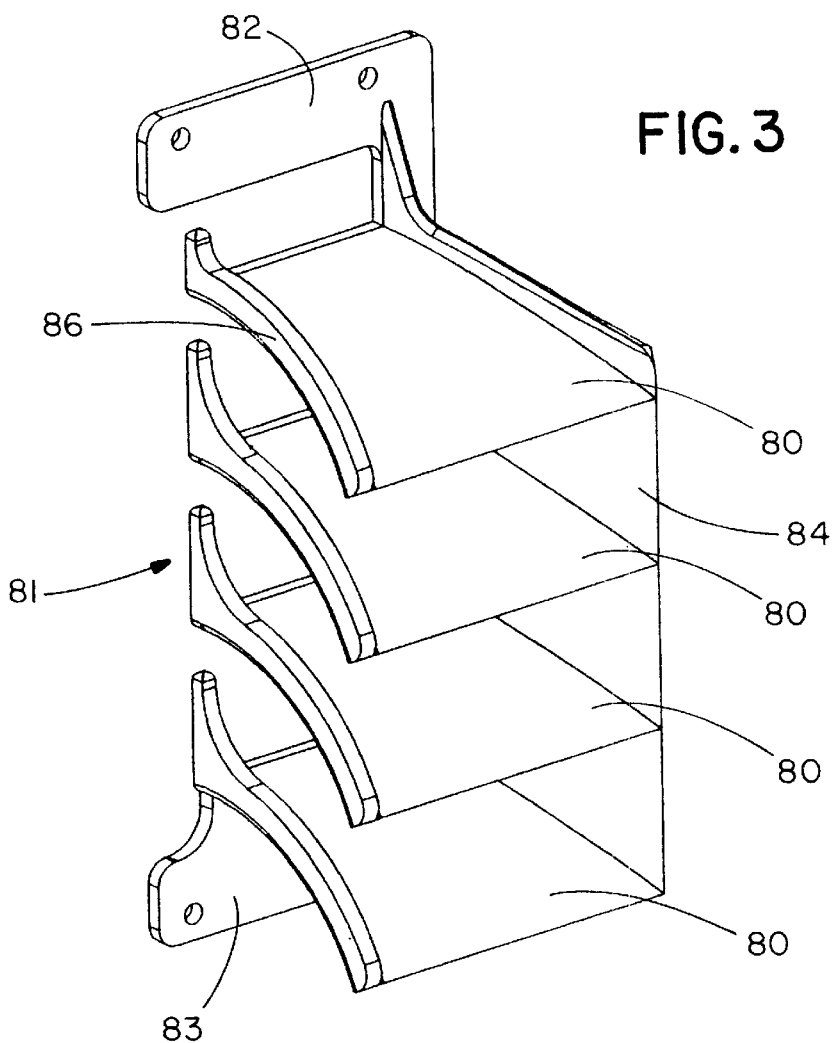
FIG. 3 is a perspective view of a fanning guide array.

A detailed perspective of the preferred embodiment of a fanning guide array 81 is shown in FIG. 3. The fanning guide array comprises a plurality of fanning guides 80, with a peripheral wall 84 and upper and lower mounting rails 82, 83. In a preferred embodiment, each individual fanning guide 80 is a curved member that functions to create a gradual directional transition in cable upon which a direction change is imposed as, for example, when cable that emerging from an enclosure 50 in a horizontal direction is routed vertically. Likewise, the peripheral wall 84 curves away from the fanning guides in the preferred embodiment in order to control the bend radius of the cable 87 and the mounting rails 82, 83 are plates that bolt onto the sidewalls 53, 55 of the enclosure 50. Each fanning guide 80 also includes an edge flange 86 located on an edge of the fanning guide 80 opposite the peripheral wall 84 to prevent cable 87 passing over the fanning guide 80 from slipping off the fanning guide 80. Similar to the peripheral wall, the edge flange 86 also curves away from the fanning guides 80 in order to protect and control the bend radius of the cable 87.

Figure 4:
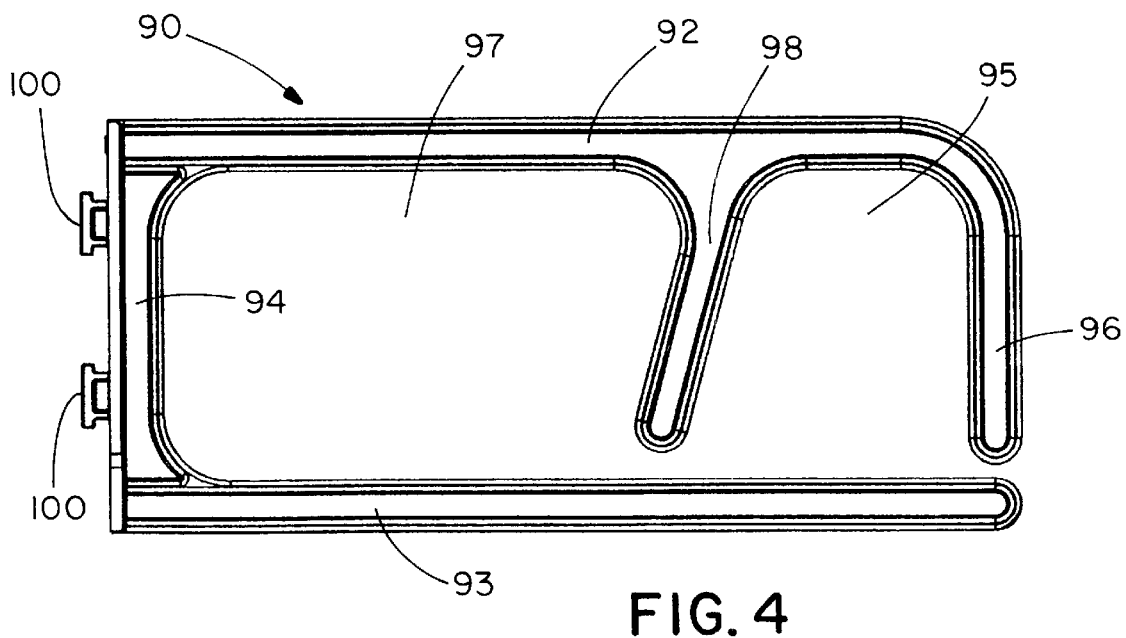
FIG. 4 is a perspective view of a cable management ring.

Referring now to FIGS. 2 and 4, the preferred vertical cable management system of the present invention also includes a plurality of cable management rings 90. Although the rings 90 could be simple ring-shaped members defining a single channel, in a preferred embodiment, the rings 90 are in the form depicted in FIG. 4, wherein the ring 90 includes first and second legs 92, 93, connected by an end wall 94. First leg 92 includes a terminal projection 96 and an intermediate projection 98, defining first and second channels 95, 97. Mounting means 100 are positioned on the end wall 94.

In a preferred embodiment, the ring 90 is attached to each enclosure mounting bracket 52, 54, locating the ring 90 adjacent to the enclosure 50, with the first channel 95 located adjacent the fanning guide array 81. Alternatively, the cable management rings 90 could be attached directly to the frame 20 or any convenient anchor site. Typically, the cable rings 90 are spaced at intervals along the frame 20 to coincide with the spacing of the enclosures 50 stacked along the frame 20, adjacent the openings (not shown) in sidewalls 53, 55 of each enclosure 50. Accordingly, a primary vertical cable pathway is defined by a plurality of stacked cable rings 90 located on both sides of each enclosure 50, that is, positioned adjacent both sidewalls 53, 55 of each enclosure 50. This is necessary so that cable may enter or exit the enclosure 50 through either opening, increasing the efficiency of cable routing.

When the preferred embodiment of the present invention is in use, as shown in FIG. 5 cable 87 that emerges from the connector array in the enclosure 50 is directed downward through the vertical cable management system. In particular, FIG. 5 shows the functioning of the fanning guide array 81, in association with the rings 90 to route cable 87 emerging from the enclosure 50. As shown in FIG. 5, cable 87 may emerge from the enclosure at different vertical levels. As the cable 87 emerges from the enclosure 50 at a particular level, it is directed over one of the plurality of fanning guides 80 at a corresponding level in the fanning guide array 81. Thus, by utilizing a fanning guide array 81 having a plurality of fanning guides 80 at different vertical levels, the accumulation and congestion of cables emerging from the enclosures is effectively managed. The fanning guides 80 also act to control the bend radius of the cable 87 as it is directed downwards and to control the placement of the cable 87 into the vertical cable pathway defined by the rings 90. Cable passing over the fanning guide array 81 is directed downwards and is collected and controlled by the ring 90, initially passing through the first channel 95 of the ring 90. As the cable continues downwards through a plurality of rings 90, the accumulating cables may be shifted behind intermediate projection 98 into the second channel 97. As shown in FIG. 5, cable 87b from enclosures 50 that are secured higher on the frame 20 passes through the second channel 97 of the ring 90. Preferably, as shown in FIG. 4, the intermediate projection 98 of the ring 90 is angled toward the end wall 94 and away from the terminal projection 96 of the ring 90 in order to simplify the shifting of cable from the first channel 95 to the second channel 97 as cable 87 is routed downwards.

Although a particular embodiment of the invention has been disclosed, those skilled in the art to which the invention pertains may make modifications and other embodiments employing the principles of this invention without departing from its spirit or essential characteristics, particularly after considering the foregoing teachings. The described embodiments are to be considered in all respects only as illustrative and not restrictive and the scope of the invention is, therefore, indicated by the appended claims rather than by the foregoing description.

We claim:

1. A vertical cable management system comprising:

a frame;

a plurality of fanning guide arrays secured to said frame, each fanning guide array including a plurality of fanning guides disposed thereon, said fanning guides for receiving and directing a plurality of cables; and a plurality of cable management rings secured to said frame and spaced intermittently between said plurality of fanning guide arrays, said rings for defining a first vertical channel and for receiving said plurality of cables from said fanning guides to control cable routing.

2. The vertical cable management system of claim 1 wherein at least one of said fanning guides includes a curved surface, a first edge with an edge flange, and a second edge secured to a peripheral wall.

3. The vertical cable management system of claim 1 wherein said plurality of cable management rings define distinct first and second vertical channels.

4. The vertical cable management system of claim 3 wherein each of said plurality of cable management rings includes an end wall, a first leg connected to said end wall, and a second leg connected to said end wall, wherein said first leg includes an intermediate projection and a terminal projection that cooperate with said second leg to define said distinct first and second vertical channels.

5. The vertical cable management system of claim 4 wherein said intermediate projection is angled toward said end wall and away from said terminal projection.

6. A vertical cable management system comprising:

a frame having a plurality of enclosures;

a plurality of fanning guide arrays secured to said enclosures, each fanning guide array including a plurality of fanning guides disposed thereon, said fanning guides for receiving and directing a plurality of cables; and a plurality of cable management rings secured to said enclosures and spaced intermittently between said plurality of fanning guide arrays, said rings for defining a first vertical channel and for receiving said plurality of cables from said fanning guides to control cable routing.

7. The vertical cable management system of claim 6 wherein at least one of said fanning guides includes a curved surface, a first edge with an edge flange, and a second edge secured to a peripheral wall.

8. The vertical cable management system of claim 6 wherein said plurality of cable management rings define distinct first and second vertical channels.

9. The vertical cable management system of claim 8 wherein each of said plurality of cable management rings includes an end wall, a first leg connected to said end wall, and a second leg connected to said end wall, wherein said first leg includes an intermediate projection and a terminal projection that cooperate with said second leg to define said distinct first and second vertical channels.

10. The vertical cable management system of claim 9 wherein said intermediate projection is angled toward said end wall and away from said terminal projection.

* * * * *